Figures 1, 2, 3:
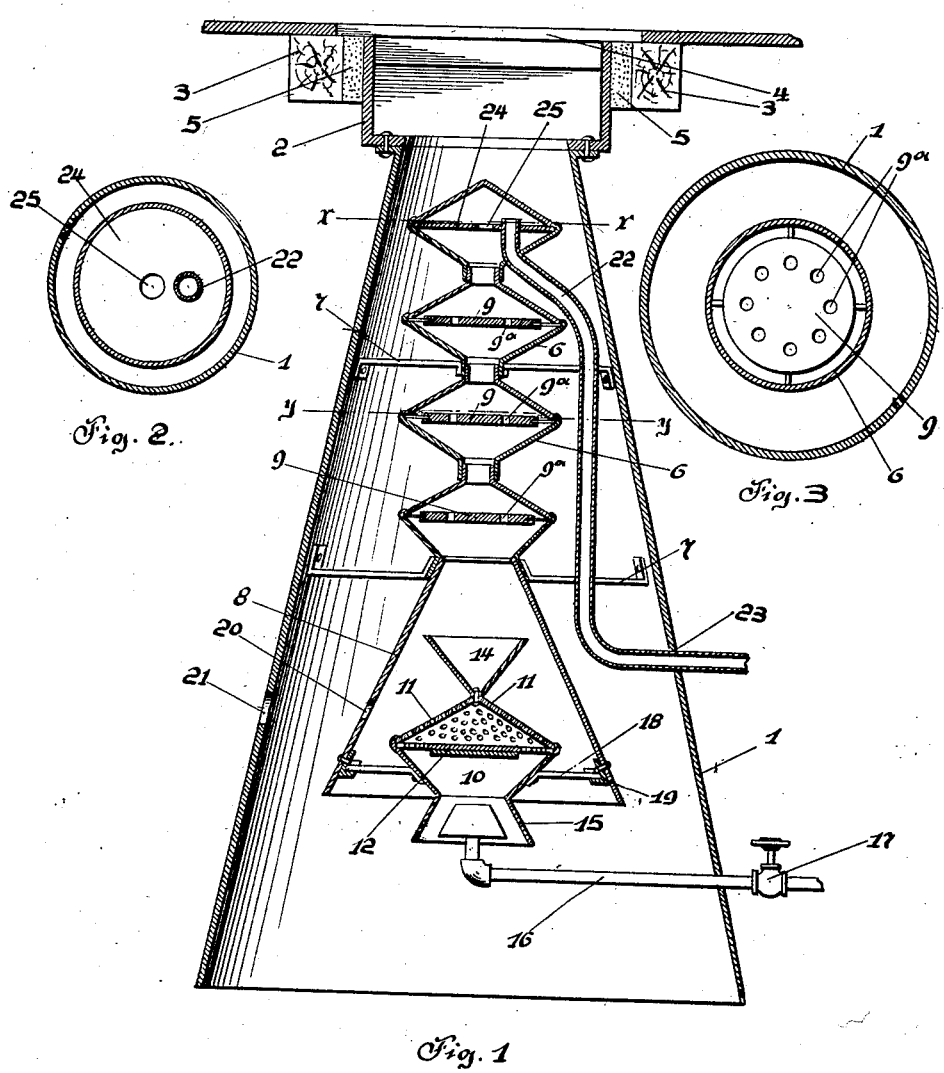

No. 854,497. PATENTED MAY 21, 1907.
C. H. HENZEL.
HEATER.
APPLICATION FILED DEC. 4, 1906.

WITNESSES:

INVENTOR
C. H. Henzel.

BY

Attorneys

UNITED STATES PATENT OFFICE.

CASPER H. HENZEL, OF ALLEGHENY, PENNSYLVANIA.

HEATER.

No. 854,497.  Specification of Letters Patent.  Patented May 21, 1907.

Application filed December 4, 1906. Serial No. 346,224.

*To all whom it may concern:*

Be it known that I, CASPER H. HENZEL, a citizen of the United States of America, residing at Allegheny, in the county of Allegheny and State of Pennsylvania, have invented certain new and useful Improvements in Heaters, of which the following is a specification, reference being had therein to the accompanying drawing.

This invention relates to heaters, and the invention has for its object to provide a simple and inexpensive heater, wherein novel means is employed for baffling the products of combustion and subjecting the cold air to a large heated surface.

Another object of this invention is to provide a heater particularly designed as a hall heater, wherein gas is used as a heating medium.

With these and other objects in view, which will more readily appear as the invention is better understood, the same consists in the novel construction, combination and arrangement of parts to be hereinafter more fully described and then specifically pointed out in the appended claims.

Referring to the drawing forming parts of this specification, like numerals of reference designate corresponding parts throughout the several views, in which:

Figure 1 is a vertical sectional view of the heater, Fig. 2 is a cross sectional view taken on the line $x$—$x$ of Fig. 1, and Fig. 3 is a similar view of the burner taken on line $y$—$y$ of Fig. 1.

To put my invention into practice I construct my improved heater of a frusto-cone shaped casing 1 suspended from a box like structure 2, which is suitably secured between the joists 3 of a floor. The box-like structure carries a conventional form of register 4 and to protect the wood-work surrounding the heater, I use asbestos or similar material 5. In the outer casing 1 is mounted a plurality of double frusto-cone-shaped casings 6, said casings fitting snugly one upon the other and supported by laterally projecting arms 7 secured to the inner sides of the outer casing 1. The topmost casing 6 is closed, while the lowermost casing is provided with a depending dome 8. In the casings 6 are arranged horizontal baffling plates 9 having openings 9ª formed therein, while in the dome 8 is mounted a suitable form of burner 10. The burner 10 serves functionally as a mixer, and is provided with perforations 11, and with a central baffling partition and plate 12.

Upon the top of the burner 10 is mounted an inverted cone-shaped deflector 14, while into the lower flared end 15 of said burner, extends a gas supply pipe 16, said pipe passing through the casing 1, and having a suitable valve 17. The burner 10 is supported within the dome 8 by outwardly extending arms 18 seating in sockets 19 carried by the inner sides of the dome 8. Said dome is provided with a small opening 20 whereby the gas can be ignited at the burner 10 and in order that said opening may be conveniently reached, I provide the casing 1 with an opening 21, although the burner may be ignited from the bottom of said casing.

The uppermost casing 6 is provided with a depending exhaust pipe 22 which passes out of the casing 1 as at 23. The upper end of the exhaust pipe extends into the casing 6 and through a partition 24 mounted therein, which is provided with a central opening 25.

In operation, the cold air is adapted to enter the bottom of the casing 1 and the bottom of the dome 8, but the air which enters the casing 1 is only permitted to escape into the compartments to be heated while the air that enters the dome 8 may assist in the combustion of the gas therein, and after passing through the various casings 6 it exhausts through the pipe 22. The baffling plates 9 within the casings 6 baffle the heated air and products of combustion sufficiently to thoroughly heat the sides of the casings whereby the cold air which passes upwardly between said casings 6 and the casing 1 will be subjected to a large area of heated surface before passing into the box-like structure 2. The depending exhaust pipe 22 also serves to heat the air passing upwardly around said pipe, thus deriving the full benefit of the heated air and products of combustion before they are permitted to escape. My invention particularly resides in the casings 6, their baffling plates, and the novel form of burner used in connection with the same.

I do not care to confine myself to the specific construction of the heater disclosed in the accompanying drawing or to the heater's use.

What I claim and desire to secure by Letters Patent, is:—

In a hot air heater, a box-like structure adapted to be suspended beneath a hot air register, a frusto-conical outer casing suspended from said structure, a plurality of superposed communicating frusto-conical casings supported within the outer casing, the uppermost casing of said inner casings closed at its upper end, a perforated baffle plate in each of said inner casings, a frusto-conical dome supported within the outer casing and in communication with said inner casings, a perforated burner-casing arranged within the dome, an inverted cone-shaped deflector on the burner casing, a gas-supply pipe extending into the burner-casing, a burner on said pipe, and an exhaust pipe communicating at its upper end with the uppermost inner casing above the baffle plate thereof and extending downwardly in the outer casing, substantially as described.

In testimony whereof I affix my signature in the presence of two witnesses.

CASPER H. HENZEL.

Witnesses:
MAX H. SROLOVITZ,
A. J. TRIGG.